US011489889B2

(12) United States Patent
Matula et al.

(10) Patent No.: US 11,489,889 B2
(45) Date of Patent: Nov. 1, 2022

(54) SELECTIVE CONTENT SHARING

(71) Applicant: Avaya Management L.P., Durham, NC (US)

(72) Inventors: Valentine C. Matula, Granville, OH (US); Manish Negi, Pune (IN); Divakar Kumar Ray, Pune (IN); Sujata Anand Gole, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/162,185

(22) Filed: Jan. 29, 2021

(65) Prior Publication Data

US 2022/0247800 A1 Aug. 4, 2022

(51) Int. Cl.

| | |
|---|---|
| ***H04L 9/40*** | (2022.01) |
| ***H04L 65/401*** | (2022.01) |
| ***G06N 3/04*** | (2006.01) |
| ***H04L 65/403*** | (2022.01) |
| ***H04L 67/104*** | (2022.01) |
| ***G06K 9/62*** | (2022.01) |

(52) U.S. Cl.

CPC ........ *H04L 65/4015* (2013.01); *G06K 9/6256* (2013.01); *G06N 3/04* (2013.01); *H04L 63/101* (2013.01); *H04L 65/403* (2013.01); *H04L 67/104* (2013.01)

(58) Field of Classification Search

CPC . H04L 65/4015; H04L 63/101; H04L 65/403; H04L 67/104; G06K 9/6256; G06N 3/04; G06F 21/6209

USPC .......................................................... 709/231

See application file for complete search history.

(56) References Cited

U.S. PATENT DOCUMENTS

| | | | | |
|---|---|---|---|---|
| 9,665,653 | B2 | 5/2017 | Badge et al. | |
| 9,965,648 | B1 | 5/2018 | Cheng et al. | |
| 10,237,325 | B2 | 3/2019 | Badge et al. | |
| 2007/0030528 | A1* | 2/2007 | Quaeler | G06F 21/6254 358/453 |
| 2012/0159296 | A1* | 6/2012 | Rebstock | G06F 40/166 715/205 |
| 2016/0378999 | A1* | 12/2016 | Panchapakesan | G06F 21/6254 726/26 |

(Continued)

FOREIGN PATENT DOCUMENTS

| | | |
|---|---|---|
| CN | 104704485 | 6/2015 |

OTHER PUBLICATIONS

"Restrict access to content by using sensitivity labels to apply encryption," Microsoft, May 7, 2020, 20 pages [retrieved online from: web.archive.org/web/20200523170159/docs.microsoft.com/en-us/microsoft-365/compliance/encryption-sensitivity-labels?view=o365-worldwide.

*Primary Examiner* — Glenford J Madamba

(74) *Attorney, Agent, or Firm* — Sheridan Ross P.C.

(57) ABSTRACT

Co-browsing allows a providing party to access visual content on a computing device for sharing with one or more other parties. The parties receiving the shared image may have dissimilar security authorizations. Accordingly, systems and methods are provided that enable shared content, such as a document, web page viewed in a browser, etc., to automatically be redacted to block those parties who are not authorized to view the content. For example, a neural network may be utilized to scan the document and provide specific redacted copies to the parties so each can view the image of the content with unauthorized content redacted.

20 Claims, 7 Drawing Sheets

(56) References Cited

U.S. PATENT DOCUMENTS

2021/0194888 A1* 6/2021 Bhaskar S ............ H04L 63/105
2021/0406399 A1* 12/2021 Damick .............. H04L 63/0442

* cited by examiner

SELECTIVE CONTENT SHARING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for secure communications and particularly to selectively redacting co-browsing content presented certain users in a multi-user session.

BACKGROUND

Co-browsing allows a first user, such as a customer of a business, to be presented content and perform interactions on their device executing a web browser or other application while a second user, such as an agent of a business, is presented with the same view as the first user on their own device. As a benefit, the second user sees what is occurring just as if they were looking over the shoulder of the first user. This is often accompanied by a second channel of communication, such as a voice call or text chat between the first and second users. As a benefit, the first user may receive guidance, troubleshooting assistance, or other expertise provided by the second user related to the web page or application having the benefit of knowing exactly what information is presented, and the operations provided, on the first user's device. For example, a customer may require assistance completing an on-line form, such as an application for a loan or insurance. Accordingly, an agent may be networked to the customer and view the specific details of the customer and provide guidance, by verbally or textually instructing the customer, or optionally by the agent performing operations remotely on the customer's computer.

During a multiparty co-browsing session, a user may need to share a document having a least one portion not appropriate for one of the other participants in the co-browsing session. While a user may identify certain portions to be restricted, such an action requires the user knows the parties on the session, and correctly identifies the document portion and correctly identifies the users who are, or are not, able see a particular portion of the document. While such systems improve security, problems remain.

SUMMARY

During active co-browsing session a user, such as customer of a business, may select and share a document dynamically. However, in a multiparty co-browsing session of the prior art, when a customer shares the selected document, is it is presented to all participants in the session. The customer may not be aware of the identity of participants in the co-browsing session or may not be aware of the role or appropriateness of each participant in an organization and their organization's authorization to view a particular document, portion of a document, or other content. Co-browsing sessions often comprise a second communication channel, such as text or voice, wherein the participants may communicate, such as to discuss issues or options related to the purpose of the co-browsing session. For example, a customer may be applying for a loan. The bank sets up a co-browsing session between the customer and two individuals. The customer may or may not be informed of any documents that may be discussed during the session and almost certainly is not aware of any difference between the two bank employees when it comes to security or their authorization to view the customer's personal or confidential information. During a co-browsing session, one of the bank's employees, an underwriting agent, may need to see a document and the personal details on the document (e.g., sources of income and amounts, bank accounts and balances, etc.) while a second bank employee, a processing clerk, may only need to see general information (e.g., title of the document, date signed, etc.) and not the personal details. Accordingly, when asked to provide the document, the customer may retrieve the document from local or remote storage for use in a co-browsing application or other application, such as a web browser configured for co-browsing. Co-browsing systems and methods of the prior art would then present an image of the document to both agents and thereby unnecessarily expose the confidential information contained in the document.

These and other needs are addressed by the various embodiments and configurations of the present invention. The present invention can provide a number of advantages depending on the particular configuration. These and other advantages will be apparent from the disclosure of the invention(s) contained herein.

In one embodiment, the user (e.g., a customer) dynamically picks a document or other content with a visual element (e.g., display generated by an application, website viewed on a browser, desktop, device or application settings, media file, input device operation, etc.) and shares it with the business, such as with multiple agents of a contact center during a multi-party active co-browsing session. Rather than requiring the user to predefine portions of the document that are, or are not, to be visible or redacted for which agents prior to sharing the document, the customer merely shares the document and, in one embodiment, an artificially intelligent (AI) agent first analyze the document and determine the portion(s) that are and are not to be visible to which ones of the agents. As a benefit, sharing documents omits preprocessing by the providing user to define fields and their associated security requirements prior to sharing. As a further benefit, agents or other participants viewing the document are presented with an image of the document (or other content) as modified to apply their particular security authorizations which differs from other agents depending on the agents differing level of authority, and without requiring human intervention beyond selecting the document or other content for sharing in the co-browsing session.

In one embodiment, a co-browsing application, which may be a stand-alone application, or included as a portion of another application, such as a web browser, web browser plug-in, and/or other application. As described herein, an image of the document (or other content) is provided with authorized content, to those authorized, and omits portions to parties not authorized, automatically and without the customer's, or other human's, intervention.

In one embodiment, the AI agent scans documents, web pages, or other content selected to be provided by one party to others in a multi-party co-browsing session. The providing user (e.g., customer) may be provided with a view showing highlights and/or other annotations to identify portions of the document that are, or are not, being provided to others in the session. Optionally, what is, or is not, provided, may be identified with respect to a particular party. Accordingly, if the user determines that a particular portion is being redacted unnecessarily, the user may override the AI agent's decision. Conversely, the user may identify a portion as needing to be redacted which was not identified as being redacted by the AI agent. The providing user may then override the AI, which then is used as an input to a subsequent training of the AI agent to identify the portion as being incorrectly redacted, or not redacted. As a result, the AI agent may learn what to block and for whom based on prior training. In another embodiment, scoring may be provided wherein content of the document is scored for privacy, security, or other reason and based on the score being above a particular threshold, redacted from view for others, which may depend upon a security score. For example, if a field has a security score of 79, then sharing the document will only reveal the field to participants having a security authorization of 79 or higher. Scoring may be provided via seed input and refined as subsequent viewings of the same, or similar, portions of documents are overridden.

In one example, a customer and agent are in a co-browsing session to complete a loan form. To verify credit the customer shares a credit card billing statement. The agent brings a credibility survey department officer into the co-browsing session to view the statement and validate the customers loan credit worthiness. The customer, agent, and the credibility officer are in the co-browsing session, if the customer shares the document entire document is visible to all the party in the session. This unnecessarily exposes sensitive information to the agent and may expose sensitive information to theft or unauthorized use by the agent or by another party having access to the agent's communication device or other information.

Accordingly, and in one embodiment, when the customer shares the document with the agent and credibility officer present, the AI agent first scans the document and depending on the calculated sensitive score level for various portions of the document, the document may be redacted and an annotated version presented to the customer to reflect proposed redactions and which party would be subject to the redactions.

If the customer agrees, or takes no action, the document with participant-specific redactions applied is presented to the participants and a subsequent weighting, confirming the correct decision was made by the AI, up-weights the decision making the same decision more likely in the future for the same, or similar, content. However, the customer is presented with the opportunity to modify the redactions, to redact previously unredacted portions or unredacted previously redacted portions, prior or after the redacted version(s) are presented. An override, then down-weights the decision making the same decision less likely in the future for the same, or similar, content.

In another embodiment, during a co-browsing session, such as between two or more employees, a document may be shared comprising sensitive and non-sensitive components for at last one of the employees. Fields or other portions of the document may be blocked based on rank, department within the company, or AI determined "need to know" based on the employees' membership within a particular category of the company's employees.

In another embodiment, training the AI agent may comprise, the analysis of past document sharing sessions of the sharing person, then build a history of what all fields been marked as sensitive (or non-sensitive) corresponding to which participant; the AI system then seeks the same or similar fields for mapping against the participants in a subsequent document sharing session; record and feed any manual adjustments make by the person sharing the document as a subsequent training of the AI system, such as to change the sensitive score level for the fields or portion against the participant for which the field or portion is, or is not, blocked.

When training the AI model, infrequent modifications will be scored lower, in terms of confidence, and applied less frequently by the AI agent, whereas constant overrides will score higher, again in terms of confidence, and subsequently be applied more frequently is subsequent encounters. The AI system may further be trained based on the person, or an attribute of the person, such as role, department, title, relationship to the sharing party and/or other participating party and their role, title, etc. such as when comprising a party or parties in a busines. For customer-agent sharing, consideration may be given to attributes of the customer (e.g., membership to a particular tier or level, demographics, financial status, point in a customer journey, etc. Additionally or alternatively, a manual review by a person or panel may audit and/or correct erroneous decisions made by the AI agent. This may be triggered by a participant flagging a decision by the AI agent as inappropriate or otherwise needing review.

In one embodiment, a system is disclosed, comprising: a network interface to a network; a data storage; a processor configured with machine-readable instructions maintained in a non-transitory memory; and wherein the processor: receiving a submitted image from a first communication device; determining, for each of a number of portions of the submitted image, a security requirement; access, for ones of a number of recipients, an authorization attribute; generate, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients; and transmit the presentation images to the corresponding ones of the number of recipients.

In another embodiment, a method is disclosed comprising: receiving a submitted image from a first communication device; determining, for each of a number of portions of the submitted image, a security requirement; accessing, for ones of a number of recipients, an authorization attribute; generating, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients; and transmit the presentation images to the corresponding ones of the number of recipients.

In another embodiment, a s system is disclosed, comprising: means for receiving a submitted image from a first communication device; means for determining, for each of a number of portions of the submitted image, a security requirement; means for determining, for ones of a number of recipients, an authorization attribute; means for generating, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients; and means for transmit the presentation images to the corresponding ones of the number of recipients.

A system on a chip (SoC) including any one or more of the above embodiments.

Any one or more of the aspects as substantially described herein.

Any of the described aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
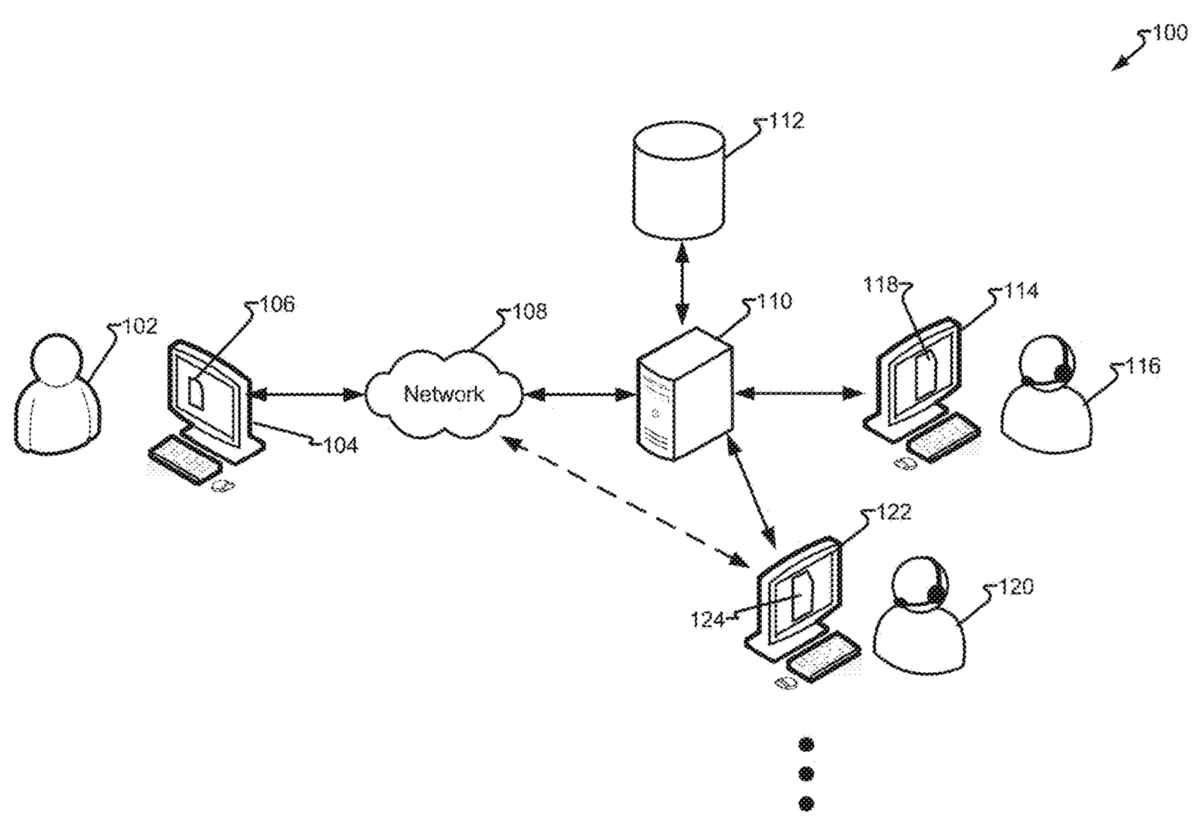
FIG. 1 depicts a first system in accordance with embodiments of the present disclosure.

FIG. 1 depicts system 100 in accordance with embodiments of the present disclosure. In one embodiment, providing user 102 wishes to share submitted image 106 with each of first recipient 116 and second recipient 120, located remotely from providing user 102, by providing first presentation image 118 and second presentation image 124 for display on first recipient communication device 114 and second recipient communication device 122, respectively. Submitted image 106 is encoded for transmission via network 108 and is first received by server 110, which comprises at least one microprocessor (more simply, "processor") configured with machine-readable instructions maintained in a non-transitory memory to cause the processor to redact certain portions of submitted image 106. The redacted versions may comprise redactions that are based, at least in part, on the specific security authorizations provided to first recipient 116 and second recipient 120. As a result, the redactions provided in first presentation image 118 may differ from the redactions provided in second presentation image 124, the difference being the result of differing levels and/or types of authorizations granted to first recipient 116 and second recipient 120.

In another embodiment, server 110 may execute an artificial intelligent agent, such as a neural network. The neural network may be trained and upon submission of submitted image 106 scans the document looking for portions of the document and, for each portion, determine a security attribute. The security attribute may be absolute, it is or is not to be redacted for all recipients, or the security attribute may be a scoring. For example, the neural network may determine that submitted image 106 comprises two portions: an address and an account number. The address may be provided with a relatively low score, such as "17" and the account number may be provided with a relatively high score, such as "73". Then, server 110 may access a record, such as record maintained in a database in data storage 112, to determine an authorization attribute for each of first recipient 116 and second recipient 120. If first recipient 116 has an authorization attribute maintained as a numerical rank, such as "65" and second recipient 120 has an authorization attribute also maintained as a numerical rank, such as "37", then first presentation image 118 and second presentation image 124 may be generated to comprise different redactions based on a comparison of the security attribute for each portion of submitted image 106 to the authorization attribute for each of first recipient 116 and second presentation image 124. As a result, the address portion, having a security attribute of "17" may not be redacted for either of first recipient 116, having an authorization attribute of "65," and second recipient 120 having an authorization attribute of "37." However, the account number, having a security attribute of "73" would be redacted for second recipient 120 but not redacted for first recipient 116.

The authorization attribute is variously embodied. Embodiments of the authorization attribute may include an authorization score, as described above, rank (e.g., agent level 1, agent level 2, etc.), title (e.g., underwriter, supervisor, officer, etc.), role (e.g., initial intake, process compliance, etc.), department (e.g., technical support, credit department, legal, etc.), and/or other attribute describing a particular group membership within an organization for a recipient, such as first recipient 116 and second recipient 120. While certain authorization attributes are relatively static, such as changing only when a recipient receives a promotion or new job assignment, other authorizations attributes may be more dynamic. Accordingly, in another embodiment, the authorization attribute may comprise a physical location of the recipient (e.g., working from an office, working from home, working from an internet cafe, etc.). In another attribute, an attribute of network 108 and/or the communication device (e.g., first recipient communication device 114, second recipient communication device 122) may be utilized. For example, for second presentation image 124 network 108 may comprise a home wireless network utilizing a more vulnerable form of encryption and, therefore, have a lower level of authorization attribute, the use of a virtual private network (VPN) may improve the authorization attribute. Similarly, second recipient communication device 122 may have an outdated anti-virus or anti-spyware application and, as a result, have a lower authorization attribute.

It should be appreciated that while an authorization attribute may be modified based the foregoing, an authorization attribute may comprise a data structure with a plurality of attributes, such as one for the recipient themselves, one for the physical location, one for the type of network pathway, one for the type of computing and/or networking equipment utilized, etc. Server 110 may determine a security requirement for the portions of the submitted image 106 for one or more of the authorization attributes. Additionally or alternatively, an absolute value may be provided. For example, an address portion may have a relatively low security attribute, but may also have an additional or alternative security requirement associated with secure devices and networks. As a result, when first recipient communication device 114 or second recipient communication device 122 are located on an insure network, have outdated security software, are located remotely from a usual office location, and/or other attribute that may indicate a higher-risk connection or eavesdropping opportunity, such portions may be blocked regardless of the score for the recipients themselves or, alternatively, require a much higher authorization attribute than if the recipient was located in the usual office and/or utilizing a more secure network and hardware.

While network 108 is illustrated as a single element, it should be appreciated that network 108 may comprise common, shared, or unique elements. For example, providing user communication device 104 may utilize network 108 comprising a home network portion for providing user 102. Network 108 may comprise shared components for first recipient communication device 114 and second recipient communication device 122, such as when co-located in the same office or inside a common network, such as a particular company. However, each comprises unique portions, such as a particular connection (wired or wireless) to each of first recipient communication device 114 and second recipient communication device 122. Furthermore alternative topologies may be utilized without departing from the scope of the embodiments provided herein, for example, second recipient communication device 122 may connect to server 110 via alternative portions of network 108, which may comprise public networks (e.g., internet) and private networks.

When providing user 102 selects content to be shared in a co-browsing session, an image of the content may be captured by providing user communication device 104, which may be configured with a co-browsing application or co-browsing enabled application. In another embodiment, the content or copy thereof, such as document, may be provided to server 110 and an image captured by a processor thereof for subsequent processing and redaction.

The term "portion" as used herein is variously embodied. Portion may be previously determined fields of the content to be shared, such as a loan application. For example, a loan application may comprise known fields including social security number, account number, etc., having a known position and size within the application. However, and in another embodiment, the portion may not be previously determined. For example, a loan application may require providing user 102 to provide verification of assets owned by providing user 102. Such verification may comprise a bank statement in a variety of formats, or statements from various other sources, brokerage firm, real estate title, appraisal, legal contract, etc. As a result, the portions and their security requirement may be dynamically determined by the neutral network.

A neural network, as is known in the art and in one embodiment, comprises self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In one embodiment, a plurality of component portions (e.g., individual marks or characters in submitted image 106) may be evaluated at a first node, then if the first node is activated, pairs of characters evaluated at a second node, if the second node is activated then triplets of characters evaluated at a third node, and so on until a conclusion is reached as to a security requirement and/or degree of security requirement.

In another embodiment, machine learning model may be utilized to identify the portions and/or determine a security attribute for the portions. The machine learning model may be seeded with an initial set of confidential portions or degree of confidentiality for the portions as an initial value of the security requirement. As the machine learning model makes a determination as to the security requirement uncorrected decisions are up-weighted, making the same decision more likely in the future when the same or similar portion is encountered or, if corrected, down-weighted, making the same decision less likely in the future, when the same or similar portion is encountered. This constantly improve functions for identifying a portion and/or security requirement. The machine learning model may be or may include any learning algorithm(s), such as, a linear regression algorithm, a logistic regression algorithm, a decision tree algorithm, a Naïve Bayes algorithm, a K-means algorithm, and/or the like. It should be appreciated that human intervention, such as by providing user 102, may be required to select or otherwise provide the content that becomes submitted image 106, but all remaining processing may be provided without any subsequent human action. While an optional override feature may be provided, as discussed more completely with respect to FIG. 3, the override option may timeout, be canceled, or otherwise be not implemented or not activated.

Figure 2:
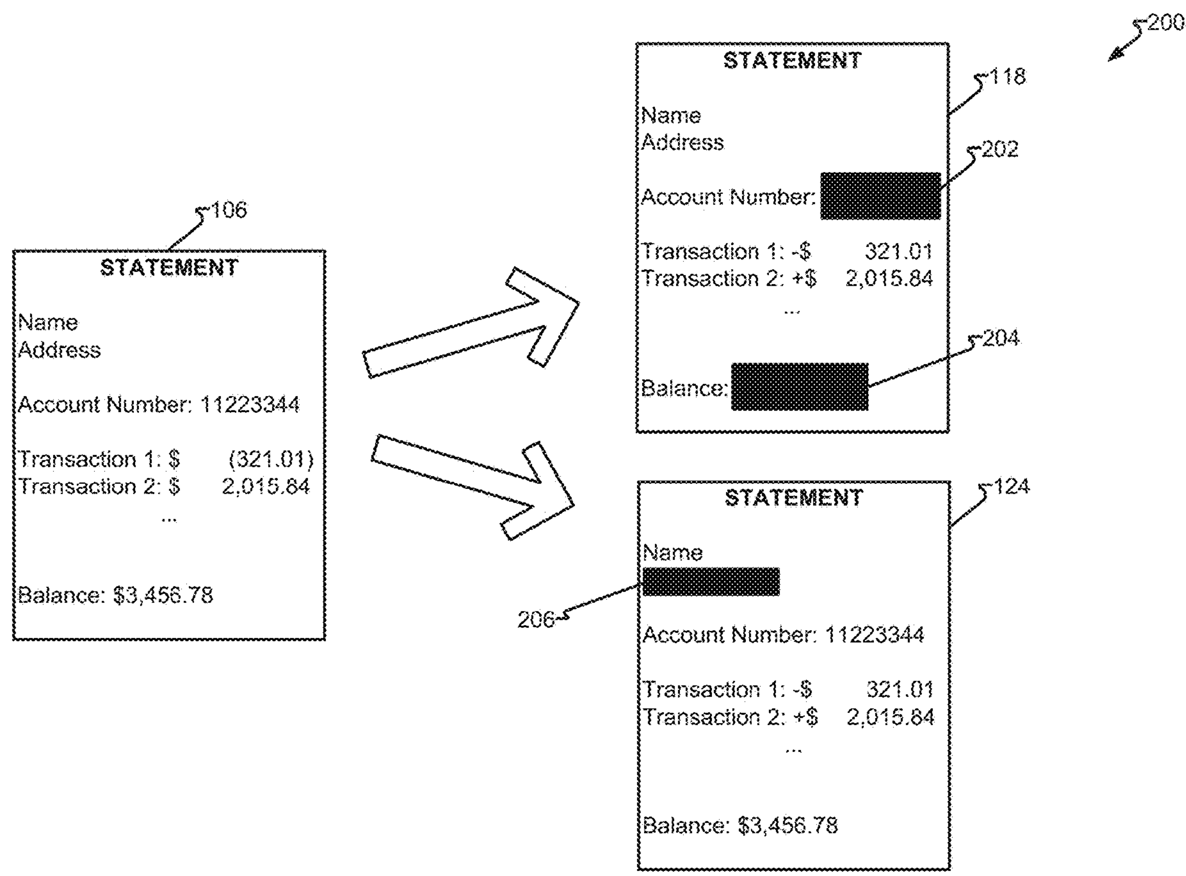
FIG. 2 depicts submitted image processing in accordance with embodiments of the present disclosure.

FIG. 2 depicts submitted image processing 200 in accordance with embodiments of the present disclosure. In one embodiment, submitted image 106 is processed, such as by server 110, to produce first presentation image 118 and second presentation image 124. In one embodiment, submitted image 106 comprises financial information, such as an account balance after a series of transactions. Processing produces first presentation image 118, in accordance with the authorization attribute of first recipient 116 and second presentation image 124, in accordance with the authorization attribute of second recipient 120 and the security requirement for portions of submitted image 106. For example, first presentation image 118 may comprise redaction 202 and redaction 204, whereas second presentation image 124 comprises redaction 206. It should be appreciated that redactions may be the same or differ between first presentation image 118 and second presentation image 124, in accordance with differences and similarities between the authorization attributes of the recipients.

Figure 3:
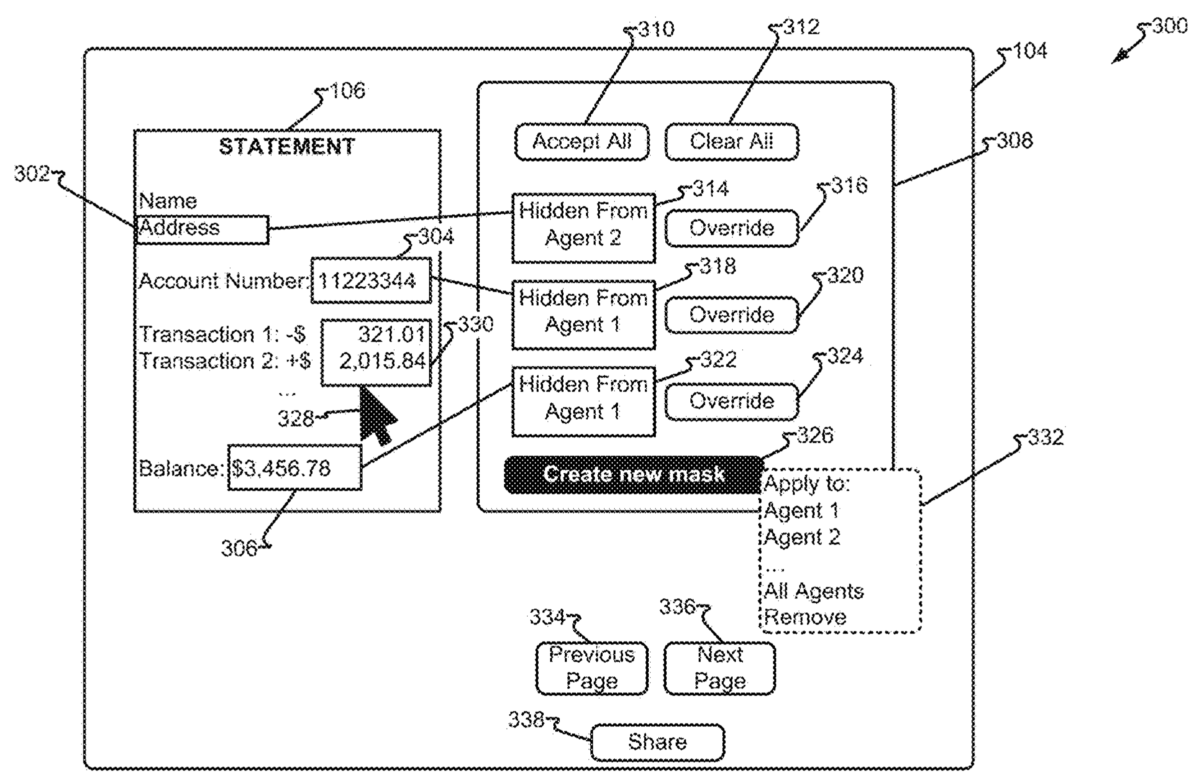
FIG. 3 depicts an override interface in accordance with embodiments of the present disclosure.

FIG. 3 depicts override interface 300 in accordance with embodiments of the present disclosure. While human intervention may be required to select or otherwise identify content for sharing in a co-browsing session, no further human intervention is required. However, and in one embodiment, providing user 102, may be presented with a preview in the form of submitted image 106 annotated to show what portions will and will not be redacted and, as a further option, specific individuals, or category of individuals for which the redaction will apply.

Accordingly, providing user communication device 104 may present submitted image 106 to providing user 102 identifying portion 302, portion 304, and portion 306 as being redacted. Dialog 308 may then be presented to provide providing user 102 with various options. For example, if providing user 102 agrees with the decision made by server 110, option 310 may be selected and all machine-made decisions accepted. Conversely, if providing user 102 disagrees with all machine-made decisions, option 312 will remove all redactions and the unredacted image of submitted image 106 will be provided to all participants.

However, individual portions may be identified and provided the opportunity to be overridden. Status 314 identifies portion 302 as being hidden from "Agent 2", which may be replace with an actual name, role, department, or other identifier. If user disagrees, option 316 may be selected to either remove portion 302 entirely for all recipients or add or change the recipient for which the portion 302 applies. Similarly, status 318 identifies the account number to be redacted and option 320 provides an opportunity to alter portion 304 or the recipient to which portion 304 applies, as well as status 322 and option 324 may allow the "balance" amount of submitted image 106 having portion 306 to be modified.

If a portion of submitted image 106 has no machine-determined redaction, providing user 102 may select option 326 to create a new redaction. For example, selected option 326 may activate pointing device 328, or other selection device configured to receive inputs from providing user 102, such as to select portion 330 for redaction. Menu 332 may then be provided to determine which recipients portion 330 will be subject to the redaction. Options 334 and 336 allows multi page documents to be navigated to the previous and next page, respectively. Once providing user 102 is content with the overrides provided, option 338 is selected and the various presentation images, such as first presentation image 118 and second presentation image 124 are generated and delivered to first recipient communication device 114 and second recipient communication device 122, respectively.

In another embodiment, the overrides provided are applied to the machine learning model and/or neural network as inputs as feedback. Accordingly, overrides will be considered in subsequent decisions to identify and/or set security requirements in subsequent submitted images.

Figure 4:
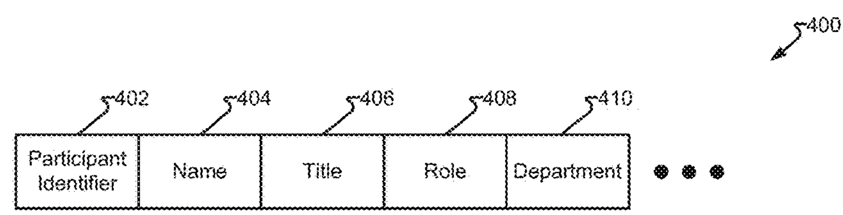
FIG. 4 depicts a first data structure in accordance with embodiments of the present disclosure.

FIG. 4 depicts data structure 400 in accordance with embodiments of the present disclosure. In one embodiment, data structure 400 describes records, such as maintained in database, which is then maintained in data storage 112 and/or other data storage. Data structure 400 describes records to maintain authorization attributes, such as for first recipient 116, second recipient 120, and/or other recipients. Field 402 identifies the participant in a co-browsing session, field 404 maintains the name of the participant, such as for presentation on a display, field 406 maintains the title, field 408 maintains a role, and field 410 maintains a department. It should be appreciated that additional, fewer, or other arrangement of fields of data structure 400 may be provided without departing from the scope of the embodiments.

Data structure 400 is not intended to provide an exclusive list of potential security attributes. For example, an administrator may create a field in data structure 400 to identify if a particular recipient of submitted image 106 has, or has not, received some particular training. Accordingly, a decision by server 110 may be made to redact portions of submitted image 106 that require the particular training but for which a recipient, identified in field 402 and/or field 404, has not received. Similarly, other fields may be established and utilized.

Figure 5:
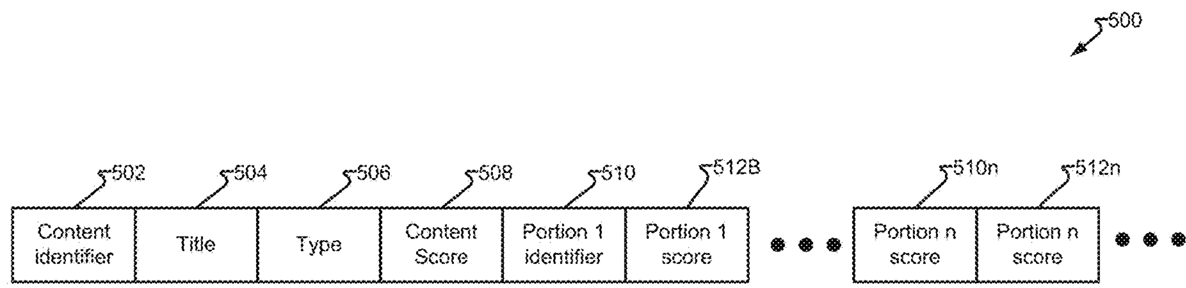
FIG. 5 depicts a second data structure in accordance with embodiments of the present disclosure.

FIG. 5 depicts data structure 500 in accordance with embodiments of the present disclosure. In one embodiment, data structure 500 describes records, such as those maintained in a database, which is then maintained in data storage 112 and/or other data storage. Data structure 500 describes records to maintain content portion attributes to be shared during a co-browsing session. For example, field 502 maintains the content, such as by title, location, key words, etc., or by a numeric or other identifier. Field 504 maintains the title of the content, field 506 maintains the type of content (e.g., document, document type, web page, web form, image, etc.), content score field 508 maintains a content score, which may be a baseline score for the entire content. For example, content that is a legal agreement may have a high degree of confidentiality wherein a mundane portion, such as a name and address, is considered more sensitive, as compared to an address on utility bill. Content score field 508, if utilized, may add to, multiply, or otherwise modify one or more portion score(s) values maintained in one or more of portion score fields 512B-512*n*. Portion identifier field 510, identifies the portion, such as by location, preceding text, preceding graphical marker, etc., of a portion and corresponding portion score fields 512B-512*n*, maintains the security requirement or requirements.

While the security requirement of portion score fields 512B-512*n*, may be ranking or similar scoring, in another embodiment, one or more of portion score fields 512B-512*n* may be a data structure, such as to identify the minimum requirements of the recipient, recipient's network, recipient's computing/networking hardware and/or software, or other requirement. For example, a security requirement may identify a location type (e.g., a recipient working from their usual office) and hours (e.g., normal work shift) and prohibit or otherwise have a higher security requirement if working from home or working outside their normal work shift.

Figure 6:
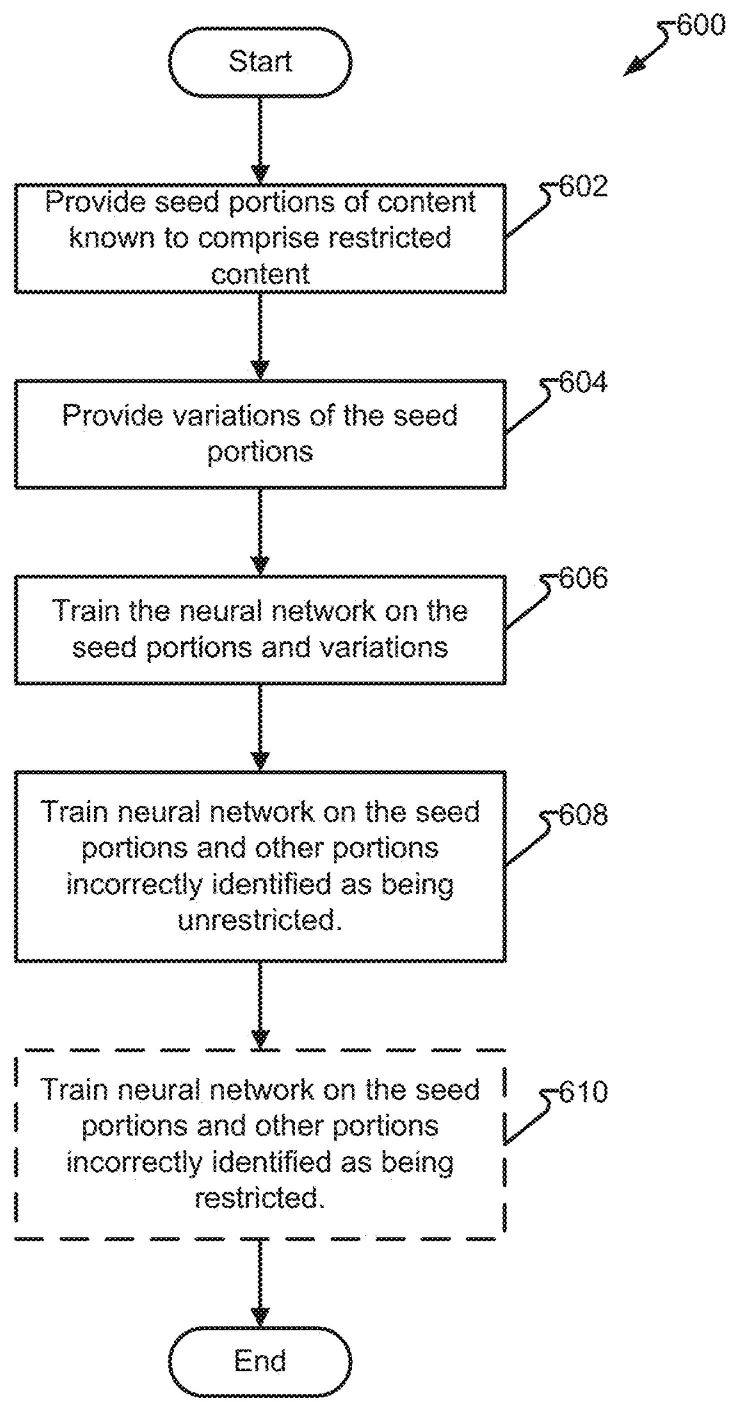
FIG. 6 depicts a first process in accordance with embodiments of the present disclosure.

FIG. 6 depicts process 600 in accordance with embodiments of the present disclosure. Process 600 may be embodied as machine-readable instructions that, when read by a processor, such as a processor of server 110 and/or other computing device, cause the processor to perform the steps of process 600. In one embodiment, process 600 trains a neural network to apply security requirements to portions of content to be shared during a co-browsing session.

Step 602 provides to the neural network an initial, or seed, set of content portions known to comprise a security requirement. As a further embodiment, step 602 provides portions having a known degree of security requirement. Step 604 provides to the neural network variations of the seed portions. For example, the portions provided in step 602 may be modified with alternate numeric values, alternate text values, etc. As a benefit, the neural network is trained with values that vary but remain subject to the security requirement. For example, account balances will rarely if ever be the same between users or accounts, it is therefore important that the neural network be exposed to variations in the account balance to then expect such variations. Accordingly, step 606 trains the neural network with the portions and the variations.

Step 608 then trains the neural network on the seed portions, provided in step 602, variations, provided in step 604, and any portions incorrectly identified as being absent the security requirement in step 606. Additionally or alternatively, the absence of the correct degree of security requirement may be utilized in step 606.

Optionally, step 610 trains the neural network on portions and/or variations of portions that are absent a security requirement but incorrectly identified as having a security requirements.

Upon completion of process 600 a neural network is trained. It should be appreciated that process 600 may be initiated, in whole or in part, at a subsequent time to refine and/or correct misidentifications.

Figure 7:
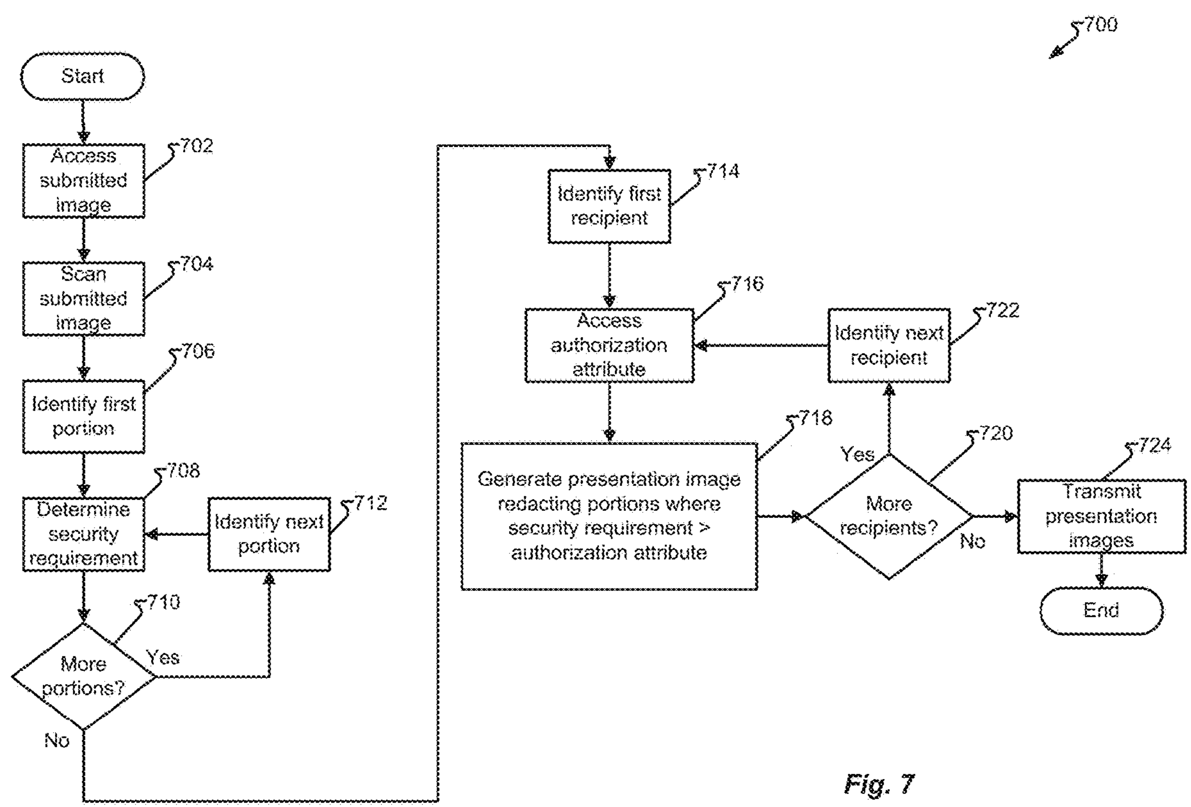
FIG. 7 depicts a second process in accordance with embodiments of the present disclosure.

FIG. 7 depicts process 700 in accordance with embodiments of the present disclosure. Process 700 may be embodied as machine-readable instructions that, when read by a processor, such as a processor of server 110, cause the processor to perform the steps of process 700.

In one embodiment, process 700 begins and, at step 702, a submitted image is accessed. The submitted image may comprise an image captured of content to be shared during a co-browsing session. Step 704 then scans the submitted image and to identify, in step 706 a first portion and the security requirement of the portion, in step 708. Step 708 may be the output of neural network, such as a neural network trained in accordance with process 600, machine learning, or similar system whereby machine-based decision is made, in whole or in part, by the machine-self configuring the determination processes of step 708. Step 708 may access a record of a portion, such as a record described by data structure 500 and maintained in data storage 112. Test 710 determines if more identified portions exist and, if determined in the affirmative, processing continues to step 712 wherein the security requirement is determined in step 708 for the next portion. If test 710 is determined in the negative, processing continues to step 714.

Step 714 identifies the first recipient of the content, or content image, provided during a co-browsing session. Step 716 accesses attributes for the recipient, such as a record described by data structure 400 and maintained in data storage 112. Step 718 then generates a presentation image comprising redactions where the attribute, determined in step 716, is insufficient for the security requirements, determined in step 708.

Next, test 720 determines if there are more recipients to be provided a corresponding presentation image and, if determined in the affirmative, step 722 identifies or otherwise accesses the next recipient and processing then loops back to step 716. If test 720 is determined in the negative, then step 724 transmits the presentation images to their corresponding recipients, by way of their corresponding communication devices.

Figure 8:
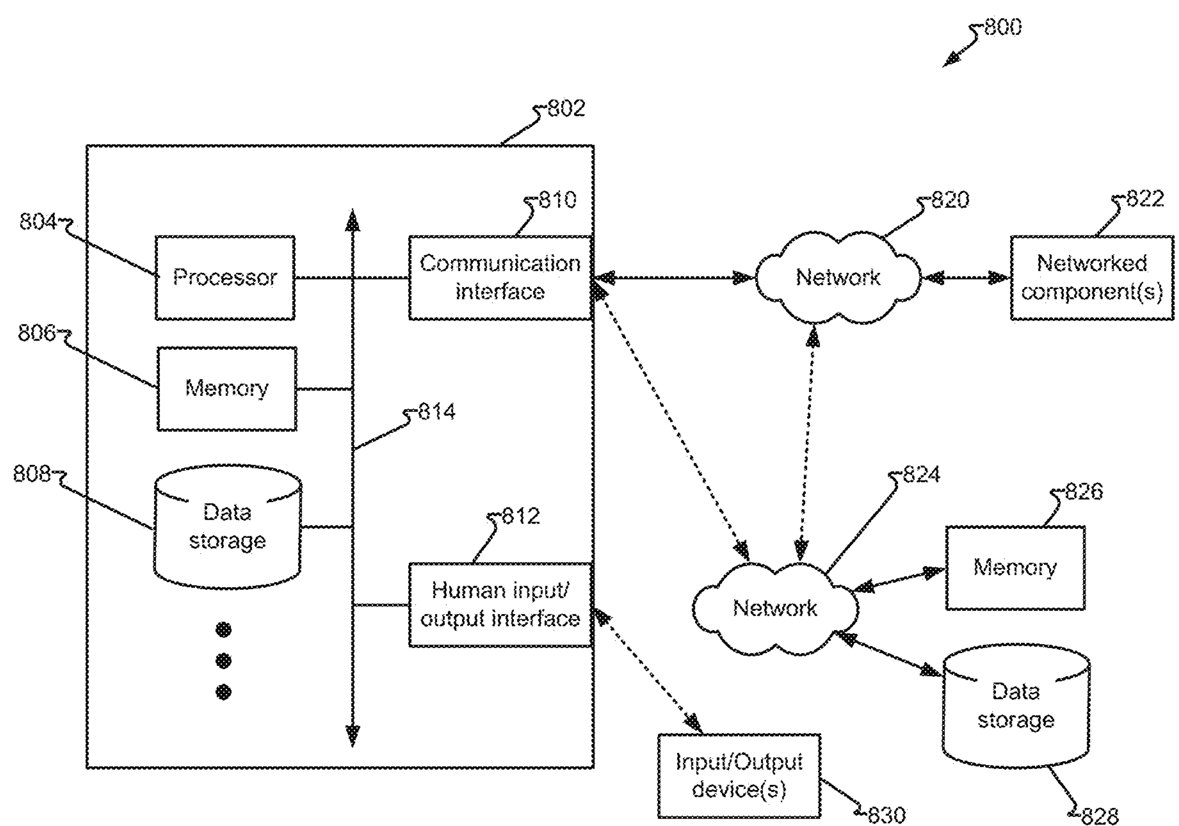
FIG. 8 depicts a second system in accordance with embodiments of the present disclosure.

FIG. 8 depicts system 800 in accordance with embodiments of the present disclosure. In one embodiment, server 110 may be embodied, in whole or in part, as device 802 comprising various components and connections to other components and/or systems. The components are variously embodied and may comprise processor 804. The term "processor," as used herein, refers exclusively to electronic hardware components comprising electrical circuitry with connections (e.g., pin-outs) to convey encoded electrical signals to and from the electrical circuitry. Processor 804 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 814, executes instructions, and outputs data, again such as via bus 814. In other embodiments, processor 804 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 804 is a non-transitory computing device (e.g., electronic machine comprising circuitry and connections to communicate with other components and devices). Processor 804 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 804). Processor 804 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 804, device 802 may utilize memory 806 and/or data storage 808 for the storage of accessible data, such as instructions, values, etc. Communication interface 810 facilitates communication with components, such as processor 804 via bus 814 with components not accessible via bus 814. Communication interface 810 may be embodied as a network port, card, cable, or other configured hardware device. Additionally or alternatively, human input/output interface 812 connects to one or more interface components to receive and/or present information (e.g., instructions, data, values, etc.) to and/or from a human and/or electronic device. Examples of input/output devices 830 that may be connected to input/output interface include, but are not limited to, keyboard, mouse, trackball, printers, displays, sensor, switch, relay, speaker, microphone, still and/or video camera, etc. In another embodiment, communication interface 810 may comprise, or be comprised by, human input/output interface 812. Communication interface 810 may be configured to communicate directly with a networked component or utilize one or more networks, such as network 820 and/or network 824.

Network 108 may be embodied, in whole or in part, as network 820. Network 820 may be a wired network (e.g., Ethernet), wireless (e.g., WiFi, Bluetooth, cellular, etc.) network, or combination thereof and enable device 802 to communicate with network component(s) 822. In other embodiments, network 820 may be embodied, in whole or in part, as a telephony network (e.g., public switched telephone network (PSTN), private branch exchange (PBX), cellular telephony network, etc.)

Additionally or alternatively, one or more other networks may be utilized. For example, network 824 may represent a second network, which may facilitate communication with components utilized by device 802. For example, network 824 may be an internal network to a business entity or other organization, whereby components are trusted (or at least more so) that networked components 822, which may be connected to network 820 comprising a public network (e.g., Internet) that may not be as trusted.

Components attached to network 824 may include memory 826, data storage 828, input/output device(s) 830, and/or other components that may be accessible to processor 804. For example, memory 826 and/or data storage 828 may supplement or supplant memory 806 and/or data storage 808 entirely or for a particular task or purpose. For example, memory 826 and/or data storage 828 may be an external data repository (e.g., server farm, array, "cloud," etc.) and allow device 802, and/or other devices, to access data thereon. Similarly, input/output device(s) 830 may be accessed by processor 804 via human input/output interface 812 and/or via communication interface 810 either directly, via network 824, via network 820 alone (not shown), or via networks 824 and 820. Each of memory 806, data storage 808, memory 826, data storage 828 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 830 may be a router, switch, port, or other communication component such that a particular output of processor 804 enables (or disables) input/output device 830, which may be associated with network 820 and/or network 824, to allow (or disallow) communications between two or more nodes on network 820 and/or network 824. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:

a network interface to a network;

a data storage;

a processor configured with machine-readable instructions maintained in a non-transitory memory; and wherein the processor:

receives a submitted image from a first communication device;

determines, for each of a number of portions of the submitted image, a security requirement;

accesses, for ones of a number of recipients, an authorization attribute;

generates, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients; and transmits the presentation images to the corresponding ones of the number of recipients; and wherein a neural network is trained in a first stage using a first training set, wherein the first training set comprises a collected set of confidential document portions, a modified set of confidential document portions, and a set of non-confidential document portions;

wherein a neural network is further trained in a second stage, comprising the first training set and the set of non-confidential document portions that are incorrectly detected as confidential after the first stage;

wherein the processor further:

generates a preview image comprising indicia of the number of portions of the submitted image that are not authorized for ones of the number of recipients;

provides the preview image to the first communication device;

receives an override signal identifying one of the number of portions of the submitted image that are not authorized for ones of the number of recipients to be provided to the ones of the number of recipients; and wherein the one of the number of portions of the submitted image that are not authorized is provided as one of the set of non-confidential document portions that are incorrectly detected as confidential.

2. The system of claim 1, wherein the security requirement, for at least one of the number of portions of the submitted image, is determined to be more restrictive than the authorization attribute for the corresponding ones of the number of recipients, upon receiving an output from the neural network trained to determine the security requirement.

3. The system of claim 1, wherein the processor further:

generates a second preview image comprising indicia of the number of portions of the submitted image that are not authorized for ones of the number of recipients;

provides the second preview image to the first communication device;

receives an override signal identifying one of the number of portions of the submitted image that are authorized for ones of the number of recipients to be provided to the ones of the number of recipients; and wherein the one of the number of portions of the submitted image that are authorized is provided as one of the first training set.

4. The system of claim 1, wherein the submitted image comprises an image of at least one of a document, a website, or an application as captured by the first communication device.

5. The system of claim 4, wherein:

the submitted image comprises a dynamic image updated at least one of a change in a visual element of the at least one of the document, website, or application; and the processor regenerates the corresponding ones of the presentation images to comprise the dynamic image modified to redact the number of portions of the submitted image having the security requirement that is more restrictive than the authorization attribute for corresponding ones of the number of recipients.

6. The system of claim 1, wherein the submitted image comprises an image of a media file presented by a media player application.

7. The system of claim 1, wherein the accessing, for ones of the number of recipients, an authorization attribute, further comprises accessing a group authorization attribute for a group comprising the ones of the number of recipients.

8. The system of claim 7, wherein the group authorization attribute comprises at least one of department, division, role, rank, title, position, or license.

9. A method, comprising:

receiving a submitted image from a first communication device;

determining, for each of a number of portions of the submitted image, a security requirement;

accessing, for ones of a number of recipients, an authorization attribute;

generating, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients;

training a neural network in a first stage using a first training set, wherein the first training set comprises a collected set of confidential document portions, a modified set of confidential document portions, and a set of non-confidential document portions;

training the neural network in a second stage, comprising the first training set and the set of non-confidential document portions that are incorrectly detected as confidential after the first stage generating a preview image comprising indicia of the number of portions of the submitted image that are not authorized for ones of the number of recipients;

providing the preview image to the first communication device;

receiving an override signal identifying one of the number of portions of the submitted image that are not authorized for ones of the number of recipients to be provided to the ones of the number of recipients;

providing the one of the number of portions of the submitted image that are not authorized as one of the set of non-confidential document portions that are incorrectly detected as confidential; and transmitting the presentation images to the corresponding ones of the number of recipients.

10. The method of claim 9, wherein the security requirement, for at least one of the number of portions of the submitted image, is determined to be more restrictive than the authorization attribute for the corresponding ones of the number of recipients, upon receiving an output from a neural network trained to determine the security requirement.

11. The method of claim 9, further comprising:

generating a second preview image comprising indicia of the number of portions of the submitted image that are not authorized for ones of the number of recipients;

providing the second preview image to the first communication device;

receiving an override signal identifying one of the number of portions of the submitted image that are authorized for ones of the number of recipients to be provided to the ones of the number of recipients; and providing the one of the number of portions of the submitted image that are authorized as one of the first training set.

12. The method of claim 9, wherein the submitted image comprises an image of at least one of a document, a website, or an application as captured by the first communication device.

13. The method of claim 12, wherein:

the submitted image comprises a dynamic image updated at least one of a change in a visual element of the at least one of the document, website, or application; and wherein generating, for ones of the number of recipients, corresponding ones of presentation images, further comprises regenerating the corresponding ones of the presentation images to comprise the dynamic image modified to redact the number of portions of the submitted image having the security requirement that is more restrictive than the authorization attribute for corresponding ones of the number of recipients.

14. The method of claim 9, wherein the submitted image comprises an image of a media file presented by a media player application.

15. The method of claim 9, wherein the accessing, for ones of the number of recipients, an authorization attribute, further comprises accessing one of a group authorization attribute for a group comprising the ones of the number of recipients, department, division, role, rank, title, position, or license.

16. A system, comprising:

means for receiving a submitted image from a first communication device;

means for determining, for each of a number of portions of the submitted image, a security requirement;

means for determining, for ones of a number of recipients, an authorization attribute;

means for generating, for ones of the number of recipients, corresponding ones of presentation images to comprise the submitted image modified to redact the number of portions of the submitted image that are not authorized for the corresponding ones of the number of recipients, wherein authorization is determined to be absent when the security requirement is more restrictive than the authorization attribute for the corresponding ones of the number of recipients; and means for transmitting the presentation images to the corresponding ones of the number of recipients; and means for training a neural network is trained in a first stage using a first training set, wherein the first training set comprises a collected set of confidential document portions, a modified set of confidential document portions, and a set of non-confidential document portions;

means for training the neural network in a second stage, comprising the first training set and the set of non-confidential document portions that are incorrectly detected as confidential after the first stage;

means for generating a preview image comprising indicia of the number of portions of the submitted image that are not authorized for ones of the number of recipients;

means for providing the preview image to the first communication device; and means for receiving an override signal identifying one of the number of portions of the submitted image that are not authorized for ones of the number of recipients to be provided to the ones of the number of recipients; and wherein the one of the number of portions of the submitted image that are not authorized is provided as one of the set of non-confidential document portions that are incorrectly detected as confidential.

17. The system of claim 16, wherein the security requirement, for at least one of the number of portions of the submitted image, is determined to be more restrictive than the authorization attribute for the corresponding ones of the number of recipients, upon receiving an output from the neural network trained to determine the security requirement.

18. The system of claim 16, wherein the submitted image comprises an image of a media file presented by a media player application.

19. The system of claim 16, wherein the means for determining, for ones of the number of recipients, an authorization attribute, further comprises means for accessing a group authorization attribute for a group comprising the ones of the number of recipients.

20. The system of claim 19, wherein the group authorization attribute comprises at least one of department, division, role, rank, title, position, or license.

* * * * *

UNITED STATES PATENT AND TRADEMARK OFFICE
CERTIFICATE OF CORRECTION

PATENT NO. : 11,489,889 B2
APPLICATION NO. : 17/162185
DATED : November 1, 2022
INVENTOR(S) : Valentine C. Matula et al.

It is certified that error appears in the above-identified patent and that said Letters Patent is hereby corrected as shown below:

In the Claims

Column 20, Line 11, Claim 1 after “wherein” delete “a” and insert --the-- therein.

Signed and Sealed this
Third Day of January, 2023

Katherine Kelly Vidal

Katherine Kelly Vidal
*Director of the United States Patent and Trademark Office*